2 Sheets—Sheet 1.
N. W. MERWIN.
BREAD-CUTTER.
No. 179,934. Patented July 18, 1876.
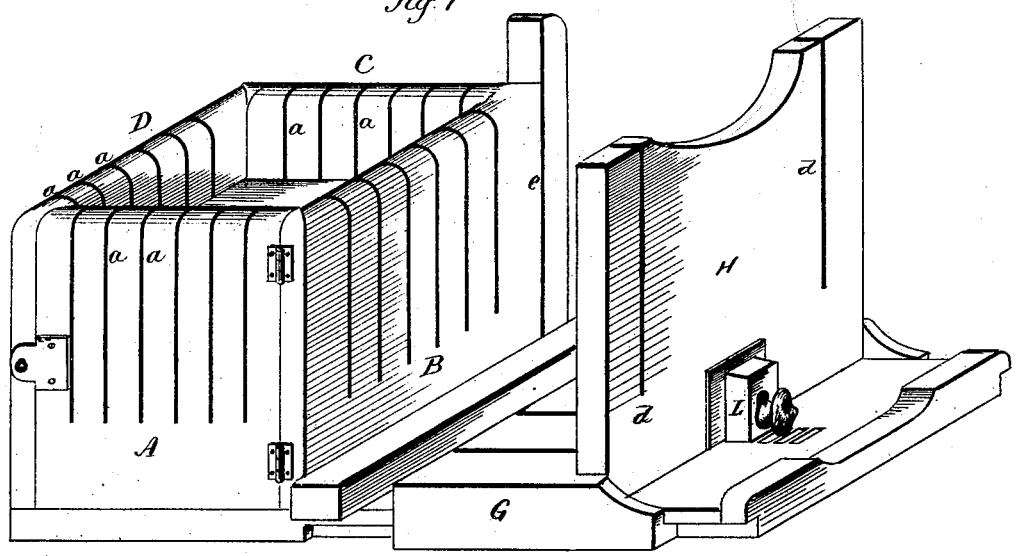
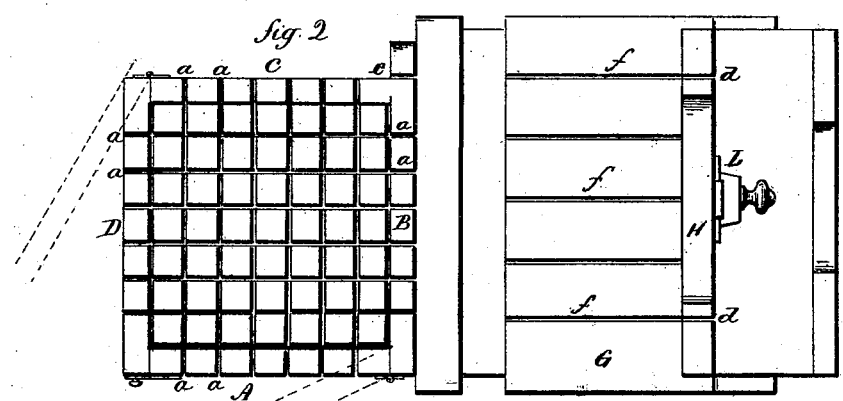
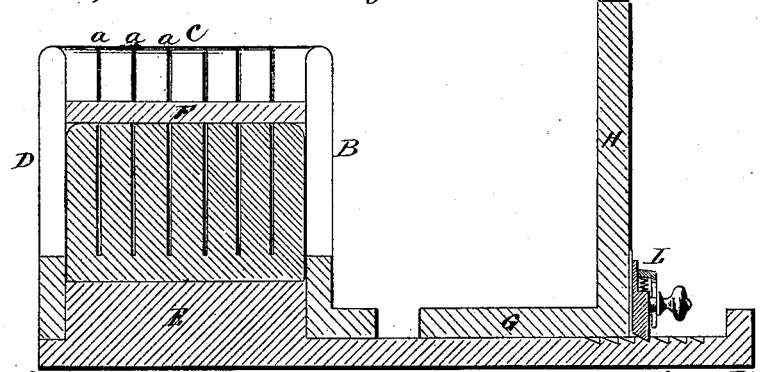
Witnesses: Nathan W. Merwin, Inventor
By Atty N. W. MERWIN.
BREAD-CUTTER.
No. 179,934.
2 Sheets—Sheet 2.
Patented July 18, 1876.
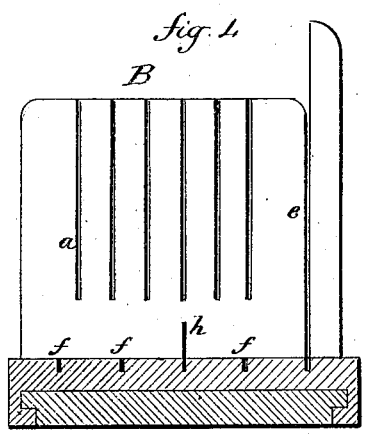

UNITED STATES PATENT OFFICE.

NATHAN W. MERWIN, OF NEW HAVEN, CONNECTICUT.

IMPROVEMENT IN BREAD-CUTTERS.

Specification forming part of Letters Patent No. 179,934, dated July 18, 1876; application filed March 2, 1876.

*To all whom it may concern:*

Be it known that I, NATHAN W. MERWIN, of New Haven, in the county of New Haven and State of Connecticut, have invented a new Improvement in Bread-Cutters; and I do hereby declare the following, when taken in connection with the accompanying drawings and the letters of reference marked thereon, to be a full, clear, and exact description of the same, and which said drawings constitute part of this specification, and represent, in—

Figure 1, perspective view; Fig. 2, plan view; Fig. 3, longitudinal vertical section; Fig. 4, transverse section.

This invention relates to a device for guiding the cuts of bread, especially adapted to the cutting of bread for sacramental uses; and consists, principally, in a rectangular case, two sides of which are hinged to open the case, and each side of this case formed with vertical slits for the passage of the knife, so as to cut the bread in two directions—that is, into blocks—while held within the case; also, in an adjustable guide for preparing the loaf for introduction to the case.

A, B, C, and D are the four sides of a case, two sides, B C, of which are made fast to a base, E, and the other two sides, A D, hinged so as to swing upon the others and open the sides. The top of the case is uncovered. Each of these sides is vertically slit, as at *a*, the slits distant from each other according to the size of the blocks to be cut.

The loaf, having been first cut to the size of the interior of the case, is placed therein, and the sides of the case locked in the closed position. The knife is then successively passed through the slits in two opposite sides, and then transversely through the slits in the other two sides, thus cutting the bread into blocks. Preferably, the slits do not extend quite to the bottom, so that the separation of the blocks will not be complete.

To prepare or shape the loaf for placing it in the case, I attach to the base an adjustable slide, G, with an end, H. In this end H, parallel with the opposing side B of the case, are two vertical slits, *d*, distant from each other the width of the case, one corresponding to one of the slits in the opposing side of the case, the other to an additional slit, *e*, outside the case.

The loaf is placed between the side B and the adjustable end H, and that end brought up against the loaf, and secured by a latch-bolt, L, or other suitable device, and then the two sides are cut by running the knife through the slits *d d*. The end H is then withdrawn, and the loaf turned to bring the previously-cut sides to the ends H and B, and the end H forced up, as before, and the other two sides dressed, and the loaf may be again turned and the other two sides taken off in like manner.

For the purpose of various thicknesses of loaf, slits *f* are formed in the slide G, into one of which a thin strip, *h*, is placed, as seen in Fig. 4, according to the thickness of the loaf desired, and one cut side is placed against that strip *h* as a guide, and the cut then made through the slits *d*. Thus the loaf may be brought to any desirable size.

I claim—

1. The bread cutting case consisting of the four sides A B C D, two of which are hinged to open the case, and each provided with vertical slits, substantially as and for the purpose described.

2. The stationary slitted end B and the adjustable correspondingly-slitted end H as guides for sizing the loaf, substantially as described.

3. The combination of the stationary slitted end B, adjustable slitted end H, the slide G, provided with slots *f*, and the guide *h*, substantially as described.

NATHAN W. MERWIN.

Witnesses:
J. H. SHUMWAY,
CLARA BROUGHTON.